United States Patent Office 3,077,039
Patented Feb. 12, 1963

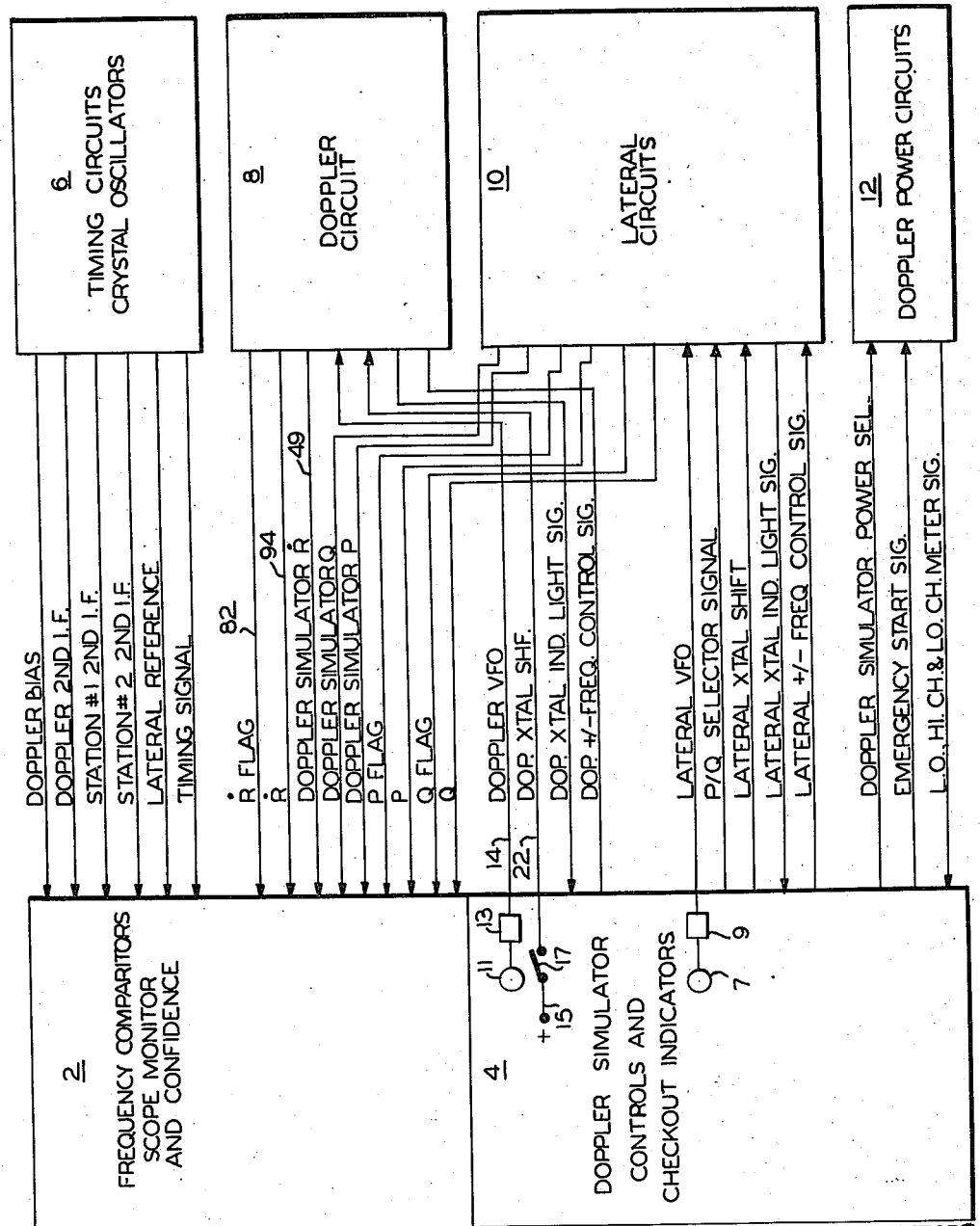

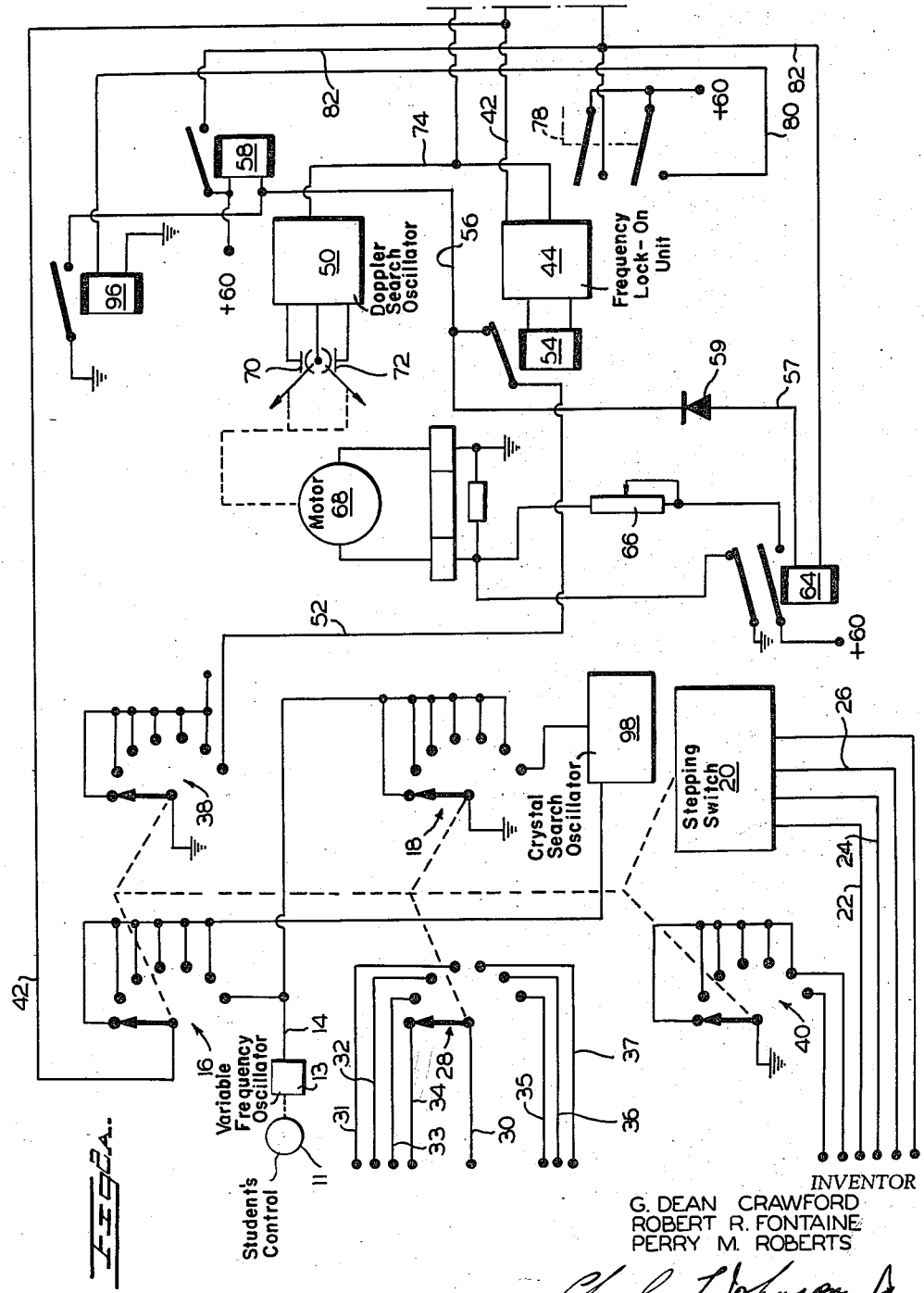

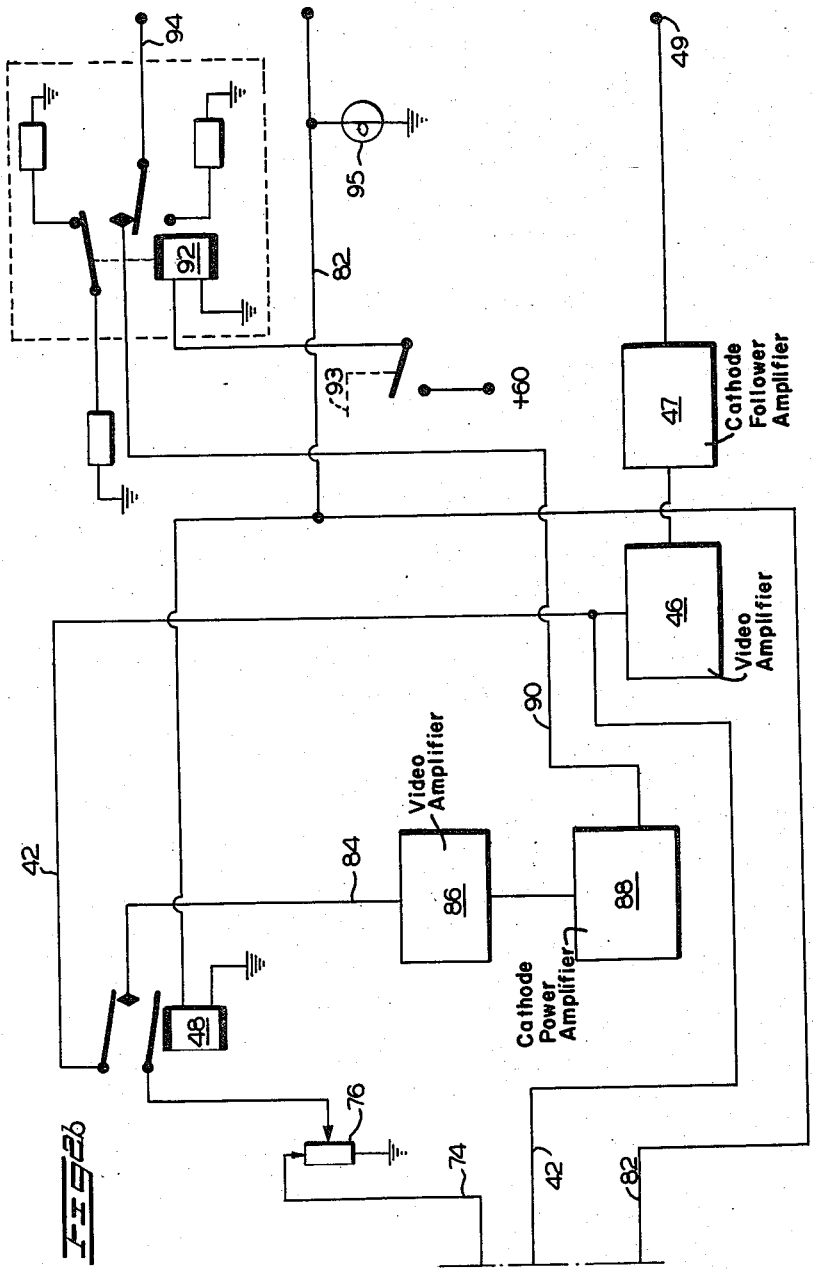

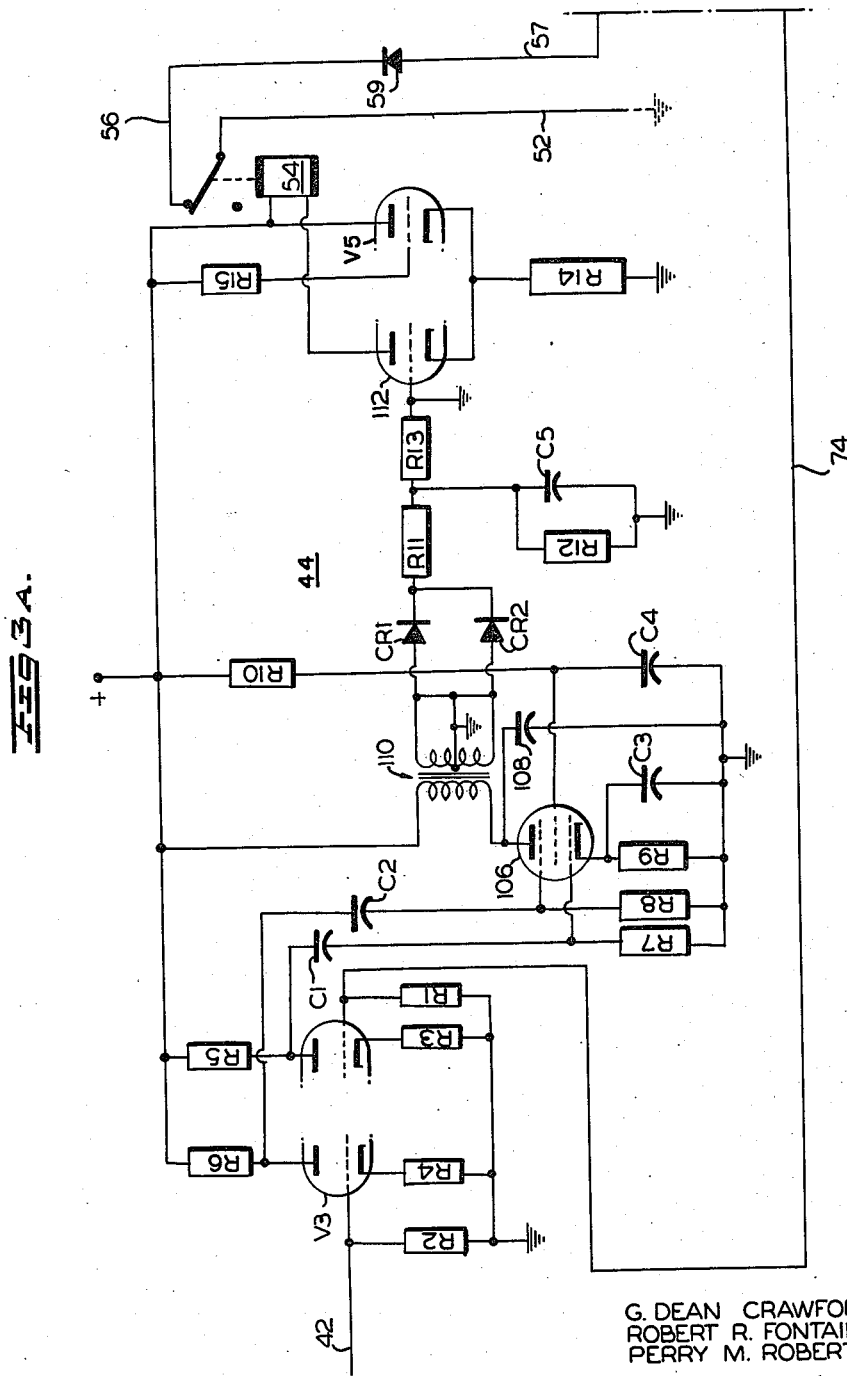

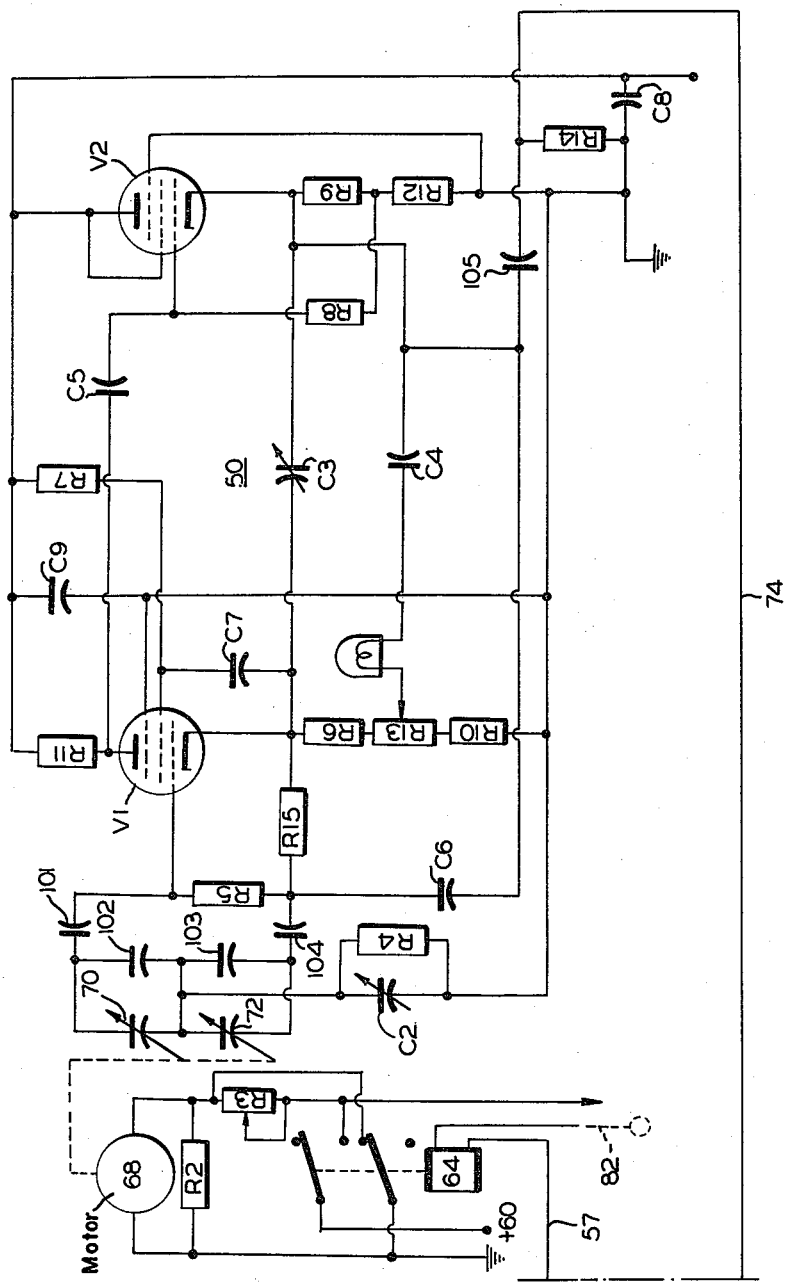

3,077,039
DOPPLER RADAR SIMULATOR INCLUDING FREQUENCY LOCK-ON APPARATUS
George Dean Crawford, Hyattsville, Robert R. Fontaine, Riverdale, and Perry M. Roberts, West Hyattsville, Md., assignors to ACF Industries, Incorporated, New York, N.Y., a corporation of New Jersey
Filed Oct. 21, 1959, Ser. No. 847,745
2 Claims. (Cl. 35—10.4)

This invention relates to simulator apparatus and, more particularly, to apparatus for training students in the proper use of search type checkout equipment.

In training personnel for operation of electronic checkout equipment involving various search phases, it is often necessary to provide accurate simulation of frequency variations. Such a need arises in training programs wherein a student must become acquainted with the checkout procedure of a search system which utilizes the Doppler principle in its operation. It is to the solution of the many problems of search simulation that this invention is directed.

It is therefore a broad object of this invention to provide apparatus whereby personnel may be trained in the use of search checkout apparatus.

It is another object of this invention to provide apparatus for the simulation of Doppler radar checkout equipment.

It is a further object of this invention to provide apparatus for simulating Doppler frequency checkout apparatus in which a frequency lock-on unit is required.

It is a further object of the invention to provide simulated search apparatus in which the variable frequency of a Doppler type search system is used.

The novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

FIG. 1 is a block diagram of the search checkout simulator.

FIG. 2A, b is a schematic drawing of the Doppler portion of the search simulator.

FIG. 3A, b is a schematic of the frequency lock-on and sweep oscillator.

This invention provides apparatus for simulating search system checkout equipment in which some of the desired information takes the form of A.C. frequency signals. In the preferred embodiment Doppler frequency search system checkout equipment is simulated wherein a student will receive training in the operation of Doppler search checkout equipment. As the actual checkout equipment of a Doppler search system contains apparatus for making frequency comparisons and checking the ability of the actual system to lock on to a frequency and follow any frequency changes, the simulation checkout equipment must be capable of reproducing these same operations synthetically. In accomplishing this the invention includes sweep oscillator and lock-on units which provide accurate and authentic simulation values and conditions.

FIG. 1 is a block diagram of the search simulator in which various indicators and controls available to the student are utilized to control circuitry which provides frequency information and condition information to the student and to computers for use in determining other simulated values. The scope monitor and confidence unit receives information from the timing circuits 6 and Doppler circuits 8 while the Doppler simulator controls 4 allow a trainee command over simulated checkout search equipment. The equipment includes timing circuits 6, Doppler circuits 8, lateral circuits 10 and Doppler power circuits 12 which feed and receive information from the scope monitor and confidence circuits 2 as well as the Doppler simulator controls and checkout indicators 4. The transfer of information is indicated between the blocks of FIG. 1 and the arrows indicate direction of flow of information.

One checkout procedure the simulator duplicates is a frequency comparison operation in which the student feeds various frequencies from crystal oscillators from 6 of FIG. 1 into frequency comparators 2 of FIG. 1 where indications, such as lights, will indicate the correct or incorrect operation of the comparator circuits.

Another phase of training involves simulation of the checkout phase wherein variable frequency search equipment is tested to see that it automatically locates a received frequency and locks-on or continues to vary in accordance with the received frequency. This is accomplished by the present invention. In its basic operation, the student may vary the frequency of an oscillator 13 by means of control 11. After this, he may monitor his indicators to determine if the equipment is searching for, finding and locking on to the frequency generated by the oscillator 13. In so doing, the Doppler frequency checkout operation of a search system is simulated. In like manner, the simulated checkout procedure of the lateral variation of a moving object may be duplicated by control of oscillator 9 by control 7. The discussions to follow are limited to the Doppler simulation which represents the velocity with which two objects are moving toward or away from each other. Almost identical circuitry is utilized for the lateral system which is an indication of an object's velocity away from a given predetermined path. In FIG. 1, as elsewhere $\dot{R}$ indicates the velocity of closure or departure, $\dot{R}$ is a signal indicating whether or not the system is at the moment searching for the frequency of a return signal or whether the frequency has been found and the equipment locked-on. P and Q represent lateral velocities of an object being tracked.

FIGS. 2A and 2b are a schematic block diagram of the Doppler search portion of the search simulator.

One aspect of the simulation is to provide circuitry whereby a student operator may select one of several test conditions of operation for checkout of moving target search equipment. In this operation the student has among other controls one by which he may select either Doppler crystal search or Doppler variable frequency search. Referring to FIGS. 2A and 2b, an oscillator 13 under the control of the student may have its output frequency varied by the control 11 and this resulting output connected to two wafers 16 and 18 of stepping switch 20, which is controlled by voltages appearing on the Doppler crystal step conductor 22. A crystal reset control lead 24 and a variable frequency oscillator reset conductor 26 are provided to return the stepping switch to its initial position. The preferred embodiment utilized a Ledex stepping switch type S10007-005, although it could well be of any standard commercial type. Applying voltage from source 15 to the conductor 22 by operation of switch 17, FIG. 1, the stepping switch drives the arms of wafers 16, 18, 28, 38 and 40 in a clockwise manner. The arms of the wafer switches are all pointed to the first contact which is designated Doppler crystal frequency #1. As pulses of control voltage are applied to conductor 22 the stepping switch 20 will drive the switch arms clockwise to the next succeeding position. The first six positions reading clockwise from the top represent six different crystal frequencies which may be selected by the student for transmittal to the frequency comparators to check the comparators operation. Wafer 28 acts as a control circuit within the instructor's equipment and is utilized to tie in a crystal indicator common conductor 30 to various conductors 31 through 37 for advising the student by a lamp which crystal frequency is being checked by the comparator.

As may be seen from the buss bar attached to the first six contacts of wafers 16, 18, 38 and 40, the major variation in operating conditions occurs when the student enters the Doppler variable frequency phase of search operations. In this phase of operation the stepping switch 20 will have moved the arms of the five wafers clockwise to the seventh position. At that time, the frequency applied to conductor 14 by the student's frequency selecor will be applied to conductor 42 which is connected to the Doppler search lock-on circuit 44 and also to video amplifier 46 and to one arm of relay 48.

The purpose of the frequency lock-on circuit 44 is to compare the frequency of the variable frequency oscillator 13 which is controlled by the student with the frequency generated by the Doppler search oscillator 50 and to control that oscillator so its frequency will coincide with that set manually by the student and which appears on conductor 14. The Doppler search oscillator 50 is a motor-driven frequency variable oscillator which is controlled in the following manner. When the student has selected the variable frequency oscillator mode of search the grounded arm of wafer 38 is applied to conductor 52 which is connected to the contact of relay 54. The lock-on unit 44 will allow relay 54 to remain in the unenergized position as shown if the two frequencies being compared are not identical. In this condition, the ground potential is applied through relay 54 to conductor 56 and, in turn, to relay 58 which thereby becomes energized applying the D.C. potential from source 60 to the conductor 82 so as to activate lamp 95 and to energize relay 64 to apply a driving voltage from source 60 through impedance 66 to the motor 68. The circuit through relay 64 is completed to ground through conductor 57, rectifier 59, the contact of plate relay 54 and conductor 52. In this condition of operation the motor 68 will drive the variable capacitors 70 and 72 so as to change the frequency of oscillator 50 until such time as the frequency output of oscillator 50 is identical with that selected by the student and which appears on conductor 42 as an input to the lock-on unit 44. When coincidence occurs between the two frequencies being compared the plate relay 54 will become energized thereby releasing the ground connection between wafer 38 and relay 58. This, in turn, de-energizes relays 58 and 64 to thereby stop the motor 68 and extinguish lamp 95 which gives an indication of whether or not the oscillator is searching. At this time, the Doppler search oscillator 50 may be said to have found the target or actually to have found the frequency which the checkout search equipment is attempting to track. The above operation provides accurate simulation for the checkout procedure of a search system in which it is desired to evaluate a student's checkout capability with a variable frequency search system.

The output of Doppler search oscillator 50 is connected by conductor 74 through impedance 76 to one arm of search relay 48, which is shown in its de-energized position. This relay is controlled by the student's automatic-manual Doppler search control 78. When placed in the down or manual position the Doppler search control switch 78 will apply the positive voltage from source 60 to conductors 80 and 82 to energize relay 48 so as to allow the output frequency from oscillator 50 to be conducted through relay 48 to conductor 84, to the video amplifier 86, to the cathode power amplifier 88, through conductor 90 and an instructor's R (go-no-go) relay 92 to the output 94. The relay 92 may be controlled by instructor's switch 93. Selection of the manual position by the student of switch 78 also applies a voltage through conductor 80 to relay 96 to apply a ground by way of conductor 56 which in conjunction with the voltage applied to conductor 82 assures the energizing of relay 64 so as to provide continuous rotation of the motor 68 which, in turn, yields a continuously varying frequency output of oscillator 50. In the automatic position of switch 78 the frequency applied to wafer 16 by the frequency selector 11 is applied by conductor 42 not only to the frequency lock-on unit 44 but also to the video amplifier 46 and htrough relay 48 shown in the de-energized position to video amplifier 86. The output of video amplifier 46 is connected to the cathode follower amplifier 47 whose output, in turn, is connected to connector 49. It may therefore be seen that during the Doppler variable frequency search mode of operation the output on terminal 49 is, at all times, a frequency indicative of change in range of the target and is, at all times, that actual frequency selected by the student whereas the output of terminal 94 is the same as terminal 49 during the automatic mode of operation but during the student's selection of manual search the output of terminal 94 is a varied frequency resulting from the continuous variable frequency from oscillator 50 due to the continuous rotation of motor 68.

During the Doppler crystal search phase of simulation, the oscillator 98 of FIG. 2A applies a signal to conductor 42 which represents the Ṙ signal to the output conductor or terminal 49 and which will cause this same frequency to appear at output 94 during automatic mode of search. During this time the student's selected frequency on conductor 14 is returned to ground by the operation of wafer 18, while during the Doppler variable frequency search phase of simulation, the oscillator 98 is inactivated by the same wafer.

FIGS. 3A and 3b are schematic diagrams of the variable frequency Doppler search oscillator 50 and the lock-on circuit 44 which work in conjunction to drive the variable frequency oscillator 50 so that it will generate a frequency identical with that selected by the student as the test frequency. The purpose of the Doppler search oscillator is to simulate the Doppler sweep checkout oscillator in a moving target checkout system.

In its preferred embodiment, as shown in FIG. 3b, the simulated Doppler sweep checkout oscillator consists of an RC phase shift oscillator utilizing two 6AG7 tubes with one element of the phase shift network made variable. This element is a motor driven straight line frequency capacitor 70 and 72. Fixed trimmer capacitors 101, 102, 103 and 104 establish the high and low end of the frequency range. The particular sweep oscillator shown in FIG. 3b sweeps over a frequency range from 450 kc. to 1.1 mc. at a sweep rate up to 30 cycles per second, depending upon the speed of the motor. The output of the oscillator is a sine wave with an amplitude that is approximately constant over the entire sweep range. A small capacitor 105 may be placed in series with the output to compensate for capacity loading due to output cabling.

The straight line frequency feature of the variable capacitor causes the output frequency versus angle of rotation to be linear.

The relay 64 which is shown in the de-energized condition in FIG. 3b is provided to control the driving motor and one side is shown returned to a voltage source, as it is when in search operation. The relay receives a ground control voltage on conductor 57 from the frequency lock-on unit 44 when plate relay 54 is de-energized. The frequency lock-on unit compares the sweep oscillator frequency with the preset variable frequency oscillator (VFO) 13. When the two frequencies are approximately equal, relay 64 is de-energized as shown in FIG. 3b. One set of relay contacts breaks the voltage to the motor while the other set of contacts shorts out the motor winding causing dynamic braking. Therefore, the sweep oscillator is stopped at a frequency very near the VFO frequency set by oscillator 13 of FIG. 2.

Thus it is seen that the use of a straight line frequency capacitor, being motor driven, provides one element of a phase shift network oscillator for simulating the checkout frequency sweep of the lateral and range Doppler signals of an object radio guidance system. In the preferred embodiment the following component values were utilized.

Resistances are designated in ohms and capacitance in microfarads unless otherwise indicated.

| | | | | |
|---|---|---|---|---|
| V1 | 6AG7 | R12 | | 4.5K |
| V2 | 6AG7 | R13 | | 2.5K |
| R2 | 50 | R14 | | 5.1K |
| R3 | 25 | R15 | | 1M |
| R4 | 2K | C2 | uuf | 45 |
| R5 | 8.2K | C3 | uuf | 45 |
| R6 | 68 | C4 | uuf | 910 |
| R7 | 68K | C5 | | .047 |
| R8 | 1M | C6 | | .05 |
| R9 | 68 | C7 | | .0022 |
| R10 | 2.7K | C8 | | 0.1 |
| R11 | 4.5K | C9 | | 0.1 |

The frequency lock-on unit of FIG. 3A will now be described. This unit receives one frequency input from a manually controlled variable frequency oscillator 13 over conductor 42 under the control of the student and its second input from the Doppler search sweep oscillator 50 over conductor 74. When the frequency of the sweep input coincides with the variable frequency oscillator input frequency the unit develops a positive bias which indirectly energizes the plate relay 54 to stop the sweep oscillator. The purpose of the lock-on unit 44 is to simulate the checkout equipment used to test the lock-on operation of an object guidance system. In a typical actual guidance system the lock-on is accomplished by means of a D.C. controlled oscillator and involves D.C. amplifiers and a loop control circuit. In the simulation of this operation, however, it is advisable to control the circuit by stopping the sweep oscillator motor when the proper frequency output is obtained. This innovation requires much less circuitry than that utilized in an operating system of an actual object guidance system.

A variable frequency oscillator signal of approximately 1 volt R.M.S. is fed into input conductor 42. This VFO frequency is manually controlled by the student by control 11 of FIG. 2A. The second input to the circuit on lead 74 is received from the sweep oscillator unit 50 which in the preferred embodiment sweeps over a frequency range from 500 kc. to 1 mc. at a sweep rate of 30 cycles per minute. If the VFO signal is set at any frequency between 500 kc. and 1 mc. the circuit will lock-on and stop the sweep oscillator at a frequency which coincides with the VFO frequency.

Lock-on takes place in the following manner. The two inputs are each first amplified in a section of dual triode V3 and then mixed in a 6AS6 mixer tube 106. Due to the plate bypass capacitor 108, and the bandpass of transformer 110, only the low beat frequencies appear on the secondary of 110. As the sweep oscillator frequency approaches the VFO frequency the difference or beat frequency becomes lower and lower in frequency until an appreciable voltage is developed across the secondary winding of transformer 110. This voltage is then rectified and filtered into a positive D.C. voltage which is fed into the grid of 112, the normally cut-off section of dual triode V5. 112 is driven into conduction which, in turn, energizes plate relay 54. The contacts of 54 break the ground connection from conductor 52 to conductor 56, retifier 59, and conductor 57 thus de-energizing relay 64 which breaks the sweep oscillator control voltage to motor 68 and stops the sweep. Conductors 52 and 82 are shown connected to phantom ground and voltage sources in FIGS. 3A and 3b respectively since they are in search operation.

If the frequency of the VFO is changed the beat frequency will increase which reduces the A.C. voltage across the secondary of transformer 110. This, in turn, removes the positive bias from 112 and de-energizes the plate relay 54 causing the sweep oscillator 50 to again sweep until the frequencies once more coincide.

Although in its preferred embodiment the sweep frequency range is 500 kc. to 1 mc., the circuit has proven successful over a frequency range from 200 kc. to 1.5 mc. The lock-on frequency tolerance is affected by the value of 108 and the bandpass of 110.

In the preferred embodiment the following circuit values were utilized:

| | | | | |
|---|---|---|---|---|
| V3 | 5814WA | R11 | | 24K |
| 106 | 6AS6 | R12 | | 0.47M |
| 112 | 5814WA | R13 | | 0.1M |
| R1 | 2.2M | R14 | | 910 |
| R2 | 2.2M | R15 | | 1.0M |
| R3 | 180 | CR1 | | IN351 |
| R4 | 180 | CR2 | | IN351 |
| R5 | 39K | C1 | uu | 10 |
| R6 | 39K | C2 | uu | 10 |
| R7 | 5.6K | C3 | | .05 |
| R8 | 5.6K | 108 | uu | 500 |
| R9 | 180 | C4 | | 0.1 |
| R10 | 6.8K | C5 | | .05 |

The oscillator 98 used in the preferred embodiment was of the type DFO-1605 manufactured by the Delta-F Company, but other commercially available oscillators would suffice in providing an operative device.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Simulated Doppler radar search and tracking checkout apparatus comprising oscillation generating means for producing first a signal having a frequency corresponding to a Doppler radar signal from a moving target, first student operated control means for varying the frequency of said oscillation generating means, a variable frequency oscillator for generating a second signal, means connected to the oscillator for sweeping the frequency thereof, a lock-on circuit having inputs connected to said oscillation generating means and said oscillator and an output coupled to the frequency sweeping means and including comparison means connected with and responsive to the said oscillator and said signal generating means for generating an A.C. signal whose amplitude is inversely proportional to the difference between the said first and second signals, rectifying and filtering means responsive to the said comparison means for converting the said A.C. comparison signal to a D.C. control signal, said frequency sweeping means being responsive to the said D.C. control signal for stopping the frequency sweeping means and causing said oscillator to generate a fixed frequency signal upon the occurrence of frequency coincidence between the said first and second signals, and means including a manual switch for placing said frequency sweeping means in operation.

2. Frequency lock-on apparatus comprising oscillator means for generating a first signal of a given frequency, means for generating a second signal of varying frequency, comparison means connected with and responsive to the said first and second signal generating means for generating an A.C. signal whose amplitude is inversely proportional to the difference between the said first and second signals, rectifying and filtering means responsive to the said comparison means for converting the said A.C. comparison signal to a D.C. control signal and control means connected to the said second signal generating means and responsive to the said D.C. control signal for causing the said second signal generating means to generate a fixed frequency signal upon the occurrence of frequency coincidence between the said first and second signals.

References Cited in the file of this patent

UNITED STATES PATENTS

| | | |
|---|---|---|
| 2,399,661 | Bowie | May 7, 1946 |
| 2,442,351 | Fritschi | June 1, 1948 |
| 2,522,541 | Saxton et al. | Sept. 19, 1950 |
| 2,693,647 | Bolster | Nov. 9, 1954 |
| 2,747,149 | Azgapetian et al. | May 22, 1956 |
| 2,759,100 | Ratcliffe | Aug. 14, 1956 |
| 2,777,214 | Birmingham | Jan. 15, 1957 |
| 2,856,701 | Leskinen | Oct. 21, 1958 |
| 2,881,535 | Harwood et al. | Apr. 14, 1959 |
| 2,887,581 | Brown | May 19, 1959 |
| 2,917,300 | Spiess | Dec. 15, 1959 |
| 2,922,157 | McShan | Jan. 19, 1960 |
| 2,951,150 | Rennenkampf | Aug. 30, 1960 |